United States Patent Office 3,826,619
Patented July 30, 1974

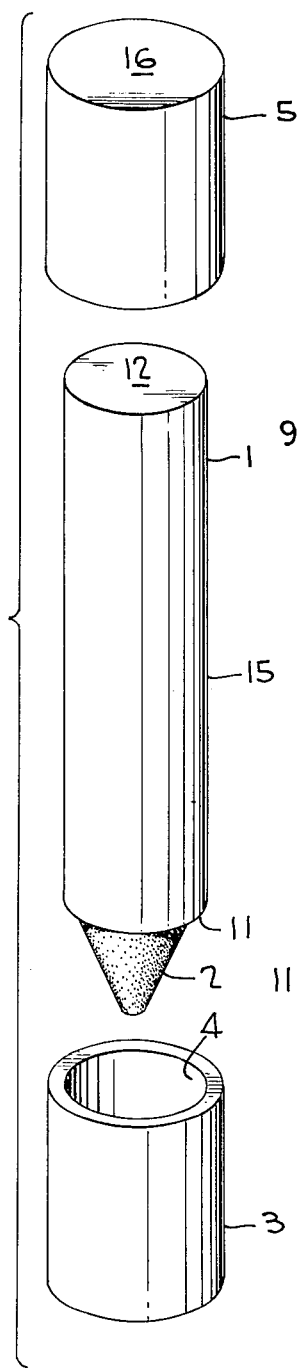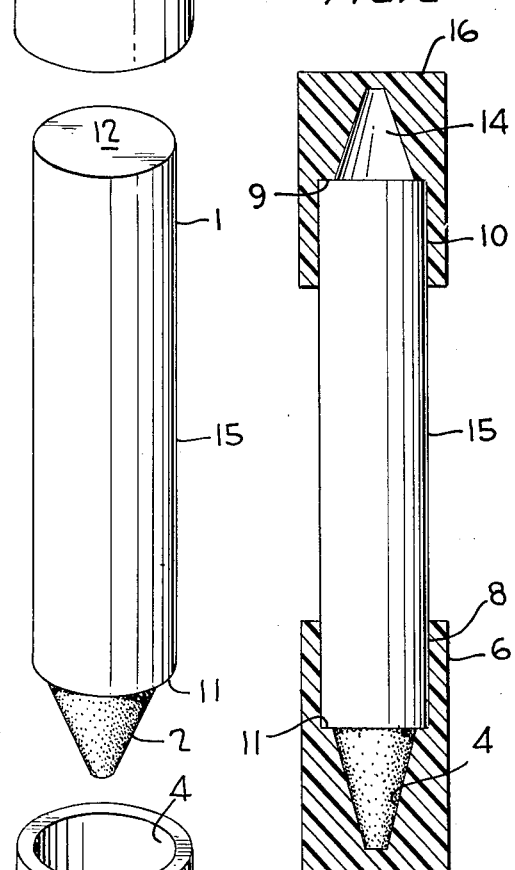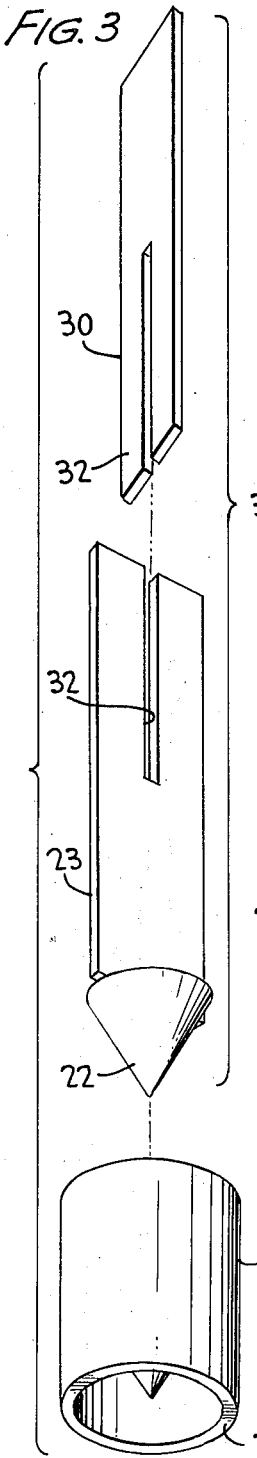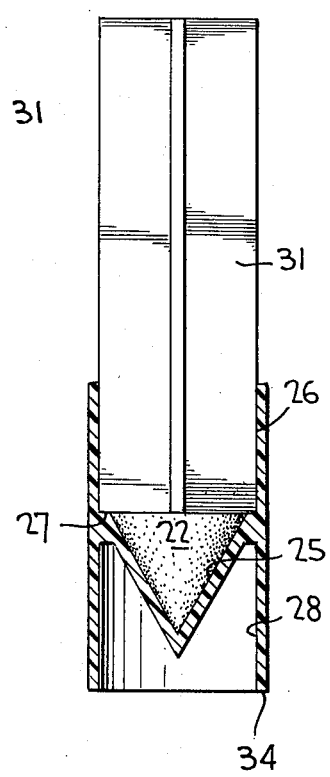

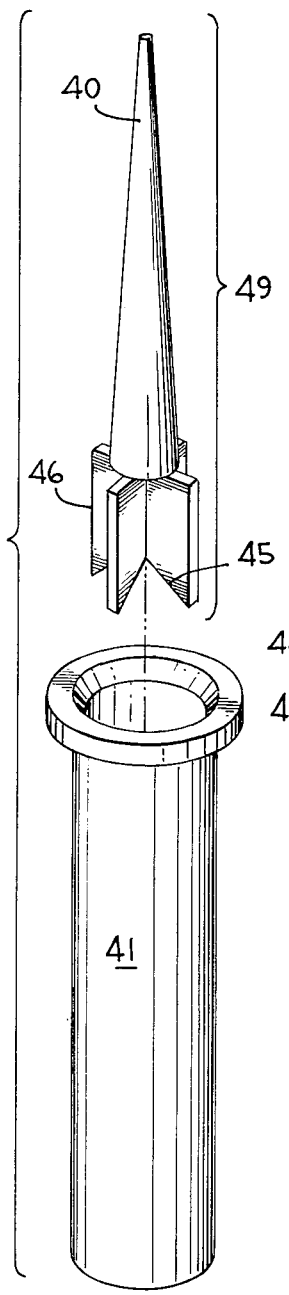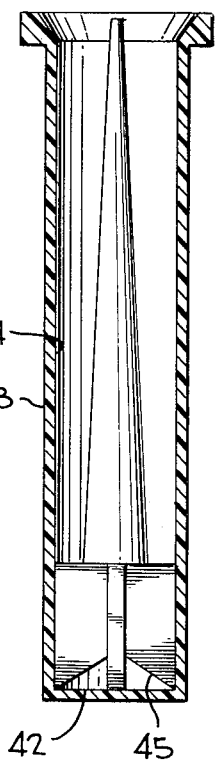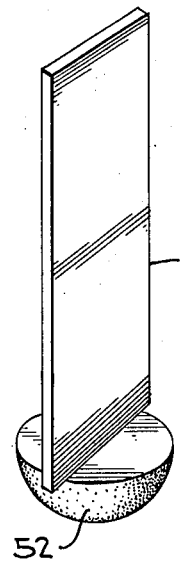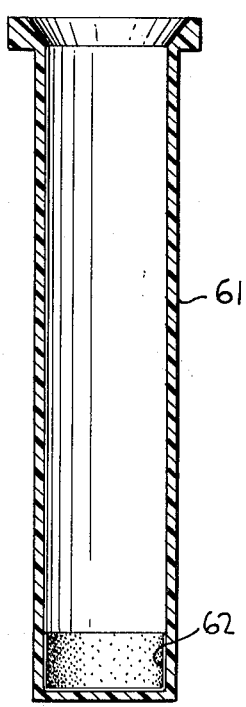

3,826,619
TEST APPARATUS FOR DIRECT RADIOIMMUNO-
ASSAY FOR ANTIGENS AND THEIR ANTIBODIES
Nicholas George Bratu, Jr., Evanston, and James Frederick Jeffries, Jr., Waukegan, Ill., assignors to Abbott Laboratories, North Chicago, Ill.
Filed Dec. 21, 1971, Ser. No. 210,511
Int. Cl. G01n 33/16
U.S. Cl. 23—253 R         14 Claims

ABSTRACT OF THE DISCLOSURE

Test apparatus for direct radioimmunoassay for antigens or their antibodies are either coated test tubes or coated inserts which are designed to either fit snugly into the base of a test tube or allow space for free mixing of the test solution.

---

This invention relates to diagnostic apparatus for use in radioimmunoassay for antigens or their antibodies. More particularly, this invention relates to diagnostic apparatus for a direct radioimmunoassay for determining hepatitis associated antigen or its antibody or antigens and antibodies having at least two free antigenically active sites.

Although there have been methods for determining the presence of antigenically active macromolecules such as intact viruses, virus capsids, subunits, bacteria, membranes, cell walls, hormones, etc., there has been a lack of a simple, yet sensitive, test method and apparatus for determining the presence of these materials. Viral hepatitis, including so-called serum hepatitis, which is a relatively common disease, has not been heretofore easily detected by a sensitive test which is both specific and reproducible for quickly determining whether or not the sera from a patient or a donor contains hepatitis associated antigens or antibodies.

Furthermore, radioimmunoassay techniques have been developed in the past for various antigen-antibody materials; however, these radioimmunoassay techniques such as disclosed in articles by Kevin Catt et al. in the *Journal of Biochemistry*, 1966, Volume 100, pages 31c and 33c in *Science*, Volume 158, page 1570, 1967, are an indirect radioimmunoassay technique wherein the amount of antigen present is roughly inversely proportional to the amount of radiation emitted by the tracer material. These procedures required the use of correlation tables and other materials which generally rendered the results less than reproducible and exact.

Briefly, it has been discovered that the above-noted difficulties, i.e. lack of reproducibility and exactness, have been overcome by utilizing the diagnostic apparatus of the present invention with the associated radioimmunoassay technique. Briefly, the diagnostic apparatus of the present invention comprises either a coated insert for a receptacle or well which is adapted to receive the unknown sample, this insert having a handle and a coated test surface attached to the handle so that the test surface fits into the tube such that the sample is in intimate contact with the coated test surface or, alternatively, a test tube with the inner walls coated.

It is therefore the principal object of the present invention to provide diagnostic apparatus for use in radioimmunoassay determinations.

It is a further object of the present invention to provide radioimmunoassay diagnostic apparatus having a high degree of reproducibility and exactness.

A still further object of the present invention is to provide a diagnostic insert for use in radioimmunoassay determinations which has a coated test surface adapted so that the unknown sample is in intimate contact with the test surface.

Still further objects and advantages of the diagnostic apparatus of the present invention will become more apparent from the following more detailed description thereof and the following attached figures wherein:

FIG. 1 is an exploded perspective view of one form of test apparatus of the present invention;

FIG. 2 is a cut-away view of the apparatus as shown in FIG. 1 after assembly;

FIG. 3 is an exploded perspective view of an alternative embodiment of the apparatus of the present invention;

FIG. 4 is a cut-away view of the embodiment as shown in FIG. 3 after assembly;

FIG. 5 is an exploded perspective view of a third embodiment of the present invention;

FIG. 6 is a cut-away view of the apparatus shown in FIG. 5 after assembly;

FIG. 7 is a perspective view showing an alternative configuration for the handle of the test apparatus; and FIG. 8 is a cut-away view of a fourth embodiment of the present invention.

Referring to FIGS. 1 and 2, the test apparatus of the present invention comprises a body 1 and two testing receptacles 3 and 5. Body 1 comprises a solid rod 15 having a conical shaped tip 2 on one end thereof. The distal end 12 of rod 15 generally is flat although its shape is not particularly important. Rod 15 is generally cylindrical in shape and may be either solid as shown in FIG. 1 or may be hollow. Rod 15 and coated tip 2 may be made from any material which is capable of being shaped, such as glass, polystyrene, polypropylene, etc. Since the test apparatus of this invention is generally disposable, being designed for a single test only, various plastics such as polystyrene and polypropylene are preferable materials. As shown in FIGS. 1 and 2 the body 1 comprises a rod 15 which is integral with coated tip 2; however, rod 15 and coated tip 2 may be made separately and joined by any suitable method such as adhesive bonding. Coated tip 2 is coated with hepatitis associated antigen or with its antibody. This coating method will be discussed in detail below. Associated with body 1 is at least one test receptacle 2, although since the test procedure requires two separate test receptacles, generally the apparatus is provided with two test receptacles 3 and 5 packaged in a configuration as shown in FIG. 2. Test receptacle 3 comprises an outer wall 6 which is generally cylindrical in configuration, a base 13, an inner cylindrical wall 8, a well 4 and an annular lip 7. The diameter of cylindrical wall 8 which extends approximately half the distance of outer wall 6 is slightly larger than the diameter of rod 15. Annular lip 7 defines the upper boundaries of the conical well 4 and mates with lip 11 of body 1. Well 4 can be any shape which ensures intimate contact of the test fluid and the coated tip 2, such as conical flattened conical, hemispherical, etc. Of course, coated tip 2 should have a similar configuration and should be slightly smaller than well 4 so the fluid is forced into the gap left between well 4 and tip 2 when inserted. It is especially important that well 4 is slightly larger than coated tip 2 since this ensures complete contact of the serum to be tested with the coating on coated tip 2.

Test receptacle 5 is initially mounted on the distal end 12 of rod 15 with annular lip 2 and cylindrical inner wall 10 fitting snugly over the outer surface of rod 15 and distal end 12 of body 1. This snug fit is necessary to ensure that well 4 and test receptacle 5 are maintained in as sterile a condition as possible. Test receptacle 5 also has a base 16.

Although the diagnostic apparatus of the present invention can be used for determining the presence of any appropriate antigen or its antibody by a simple yes-no technique, the use of the apparatus of the present invention will now be described with respect to a procedure for determining the presence of hepatitis associated antigen.

Body 1 is initially removed from test receptacle 3 and a sample of blood or serum is placed in well 4. If the test is to be conducted for hepatitis associated antigen, a body 1 with a coated tip 2 is utilized wherein the coating comprises anti-hepatitis associated antigen. Body 1 is replaced in test receptacle 3 so that the coated tip 2 is in intimate contact with the serum contained in well 4. The apparatus is then set aside and incubated for a predetermined period of time. Following this incubation, test receptacle 5 is removed from body 1 and the radioactively labeled or tagged anti-hepatitis associated antigen is placed therein. Body 1 is then removed from test receptacle 3, washed and rinsed and placed in test receptacle 5 so that the coated tip 2 is in intimate contact with the tagged anti-hepatitis associated antigen. The body 1 and test receptacle 5 are then incubated for an additional period of time. Test receptacle 3 should be covered during this incubation process so that the serum which remains in well 4 is not contaminated. Following the incubation period, body 1 is removed from test receptacle 5 and coated tip 2 is rinsed. Body 1 is then placed in test receptacle 3 and body 1 and test receptacle 3 are placed in the well of any conventional apparatus designed to count gamma radiation. The amount of radiation is recorded and compared with a blank sample which has been run simultaneously, in order to determine the background count rate. A test sample with a count rate above that of the background rate would be considered antigen positive thus providing a simple yes-no test without resorting to correlation tables and graphs.

FIGS. 3 and 4 show a second embodiment of the apparatus of the present invention. This apparatus comprises a body 21 comprising at least two separate parts, handle 31 and coated tip 22. Handle 31 may be either integrally molded to form a handle with a cross-section in the shape of an X or, as shown in FIG. 3, handle 31 may comprise two rectangular pieces 23 and 30, each having a small rectangular slit 32 and 33 therein so that handle portions 23 and 30 may be slid together to form the X-shaped handle 31. Handle 31 may be attached to coated tip 22 by any conventional joining method such as adhesive bonding or alternatively the entire assembly may be molded by any suitable method. Again, body portion 21 may be made from any material which can be formed into the shape with polystyrene and polypropylene being preferred. Coated tip 22 is shown as having a pointed conical configuration as opposed to the somewhat flattened conical tip 2 as shown in FIGS. 1 and 2. Any similar configuration can be utilized as long as the well with which this tip is to be utilized has a similar configuration.

Test receptacle 24 is an alternative form of the test receptacles as shown in FIGS. 1 and 2. Test receptacle 24 has an outer cylindrical wall 33 and a pair of inner cylindrical walls 26 and 28. Test receptacle 24 has a well 25 and an annular lip 27 having a similar configuration to well 4 and annular lip 7 as shown in FIGS. 1 and 2. Whereas the test receptacles as shown in FIGS. 1 and 2 have a solid base beneath the well, this area in test receptacle 24 is hollow, the space being defined by inner wall 28 and the outer wall 29 of well 25. This type of test receptacle utilizes less materials and is preferred since the apparatus is designed for a single use. Test receptacle 24 rests on annular edge 34 which forms the bottom end of outer cylinder 33. Although not shown in FIGS. 3 and 4, test receptacle 24 may be designed in such a way that these test receptacles may be nested, i.e. placed one within the other. This may be done by utilizing a test receptacle with a stepped or slanted sidewall such that the upper portion of outer wall 33 will fit within inner wall 28. As with coated tip 2 and well 4 in FIGS. 1 and 2, well 25 should be slightly larger than coated tip 22 so that when coated tip 22 is placed in well 25, the sample contained therein is displaced up the sides so as to ensure intimate contact between the coating on coated tip 22 and the material to be tesed in well 25.

FIG. 7 shows an alternative handle 51 which may be utilized in place of handle 31. Handle 51 is simply a rectangular sheet of material, such as polystyrene or polypropylene, and is directly attached to hemispherical tip 53. Handle 51 may be integrally formed with coated tip 52 or may be joined thereto by any conventional means such as adhesive bonding.

FIGS. 5 and 6 show yet another embodiment of the apparatus of the present invention. This embodiment generally comprises a test receptacle 41 which is generally in the shape of an ordinary test tube. Test receptacle 41 has a cylindrical inner wall 44 and outer wall 43 and a flat bottom 42. The body of the test apparatus 49 comprises a handle portion 40 and an X cross-sectionally shaped coated section 46. The handle portion 40 and the coated portion 46 may be either integrally formed or separately formed and joined by any suitable conventional method. Coated tip 46 has a width substantially similar to but slightly less than the diameter of the inner wall 44 of the test receptacle 41. The bottom end of coated portion 46 presents four angularly shaped cuts 45 so that the serum which is placed in test receptacle 41 can freely contact all of coated tip 46. In utilizing the apparatus as shown in FIGS. 5 and 6, the test sample is placed in the bottom of test receptacle 41 and body portion 40 is placed therein, followed by agitation. The apparatus as shown in FIGS. 5 and 6 is especially well adapted for use where larger quantities of serum are available. When smaller quantities of serum are available, however, the apparatus shown in FIGS. 1, 2, 3 and 4 is preferred since this apparatus ensures intimate contact between the coated test portion and the unknown sample.

FIG. 8 shows a fourth embodiment of the apparatus of the present invention. Basically, this embodiment comprises a test tube 61 having a coated portion 62. Coated portion 62 has a coating of hepatitis associated antigen or its antibody and is preferably located as shown, i.e. in the bottom of the tube. Although this embodiment is the easiest to produce since a measured quantity of antigen or antibody can be placed in the tube and incubated, the test results are slightly less reproducible than the other embodiments. Again the tube may be formed from any conventional material with polystyrene and polypropylene being preferred. Furthermore, this apparatus is more suitable for tests using a large sample of serum and requires constant agitation during testing.

In order to form the apparatus of the present invention, tips 2, 22 and 52 and coated portions 46 and 62 must be coated with either an antigen or its antibody. A hepatitis associated antibody solution of anti-Australia antigen having a concentration of from about 1 to about 100 micrograms of protein per ml. is prepared in from about 0.005 to about 0.02 molar Tris-HCl, i.e. 2-amino-2-hydroxymethyl-1,3-propanediol-HCl, utilizing an anti-Australia antigen serum. The Tris-HCl buffers the solution to a pH of from about 7.1 to about 9.5 along with from about 0.01% to about 0.05% sodium azide. One ml. of this hepatitis associated antibody is then coated on the test tips or tube surfaces by incubating at room temperature for from 6 to 72 hours. These coated tips or tubes are then washed with about 0.005 to about 0.02 molar Tris-HCl at pH of 6.9 to 8.4 plus from about 0.01% to about 0.05% sodium azide. Following this washing and rinsing steps, test bodies may be stored at 4° C. until necessary for use for radioimmunoassay.

It is preferred to utilize a 0.01 molar solution of Tris-HCl and 0.2% sodium azide buffered at a pH of 7.1 for both the incubation medium and the washing medium.

The amount of antibody coated on the inserts or in the tubes is not critical since test is run each time in comparison with a blank test. No standard curves or charts are necessary for the test of the present invention; therefore, no specific amount of antigen in the coating is required as long as two similar inserts or tubes are used.

Furthermore, since the direct radioimmunoassay is often conducted simultaneously with blank tests for comparative purposes, the inserts as shown in FIGS. 1, 2, 3, 4, 5, 6 and 8 may be molded in sheets connected at the handle end. These combined inserts may be separated prior or subsequent to coating with the antigen or its antigen or its antibody in order to facilitate coating and inventory or they may be separated into groups of 2, 3 or 4 inserts or whatever number is convenient for use with a series of joined test receptacles. These test receptacles may be a sheet with a series of spaced wells or may be a series of the wells as shown in FIGS. 1 to 6 which have not been separated subsequent to molding. The use of multiple inserts presents the advantage that the incubation times for the unknown sample and the blank samples will be identical, thus ensuring the accuracy of the comparison.

While the test apparatus of the present invention has been illustrated by way of the foregoing specific embodiments, the test apparatus of the present invention should be in no way limited thereto but should be construed as broadly as any and all equivalents in the appended claims.

What is claimed is:

1. Test apparatus for use in a direct radioimmunoassay for antigens or their antibodies comprising:
   a receptacle for receiving a sample to be assayed; and
   an insert having a handle portion and a tip portion, said tip portion fitting within said receptacle and said tip portion being coated with an antigen or its antibody which binds a corresponding antibody or antigen in said sample.

2. The apparatus of Claim 1 wherein said receptacle has a well for receiving said sample to be assayed, said well and said insert having a similar shape, said well being slightly larger than said insert.

3. The apparatus of Claim 1 wherein said receptacle and said insert are made from a material selected from polystyrene and polypropylene.

4. The apparatus of Claim 2 wherein said receptacle and said insert are made from a material selected from polystyrene and polypropylene.

5. The apparatus of Claim 2 wherein said well and said receptacle are conical in shape.

6. The apparatus of Claim 2 wherein said well and said insert are flattened conical in shape.

7. The apparatus of Claim 2 wherein said well and said insert are hemispherical in shape.

8. Test apparatus for use in a direct radioimmunoassay for hepatitis associated antigen or its antibody comprising:
   a receptacle for receiving a sample selected from blood or plasma to be assayed; and
   an insert having a handle portion and a tip portion, said tip portion fitting within said receptacle and said tip portion being coated with heptatitis associated antigen or its antibody.

9. The apparatus of Claim 8 wherein said receptable has a well for receiving said sample to be assayed, said well and said insert having a similar shape, said well being slightly larger than said insert.

10. The apparatus of Claim 8 wherein said receptacle and said insert are made from a material selected from polystyrene and polypropylene.

11. The apparatus of Claim 9 wherein said receptacle and said insert are made from a material selected from polystyrene and polypropylene.

12. The apparatus of Claim 9 wherein said well and said receptacle are conical in shape.

13. The apparatus of Claim 9 wherein said well and said insert are flattened conical in shape.

14. The apparatus of Claim 2 wherein said well and said insert are hemispherical in shape.

References Cited

UNITED STATES PATENTS

| | | | |
|---|---|---|---|
| 3,206,602 | 9/1965 | Eberle | 23—230 B |
| 3,464,798 | 9/1969 | Kilthau | 23—253 R |

MORRIS O. WOLK, Primary Examiner

R. E. SERWIN, Assistant Examiner

U.S. Cl. X.R.

23—230 B, 253 TP, 259; 424—12, 16, 1